UNITED STATES PATENT OFFICE.

ANTON LEDERER, OF ATZGERSDORF, NEAR VIENNA, AUSTRIA-HUNGARY.

MANUFACTURE OF TUNGSTEN FILAMENTS FOR INCANDESCENT ELECTRIC LAMPS.

1,047,540. Specification of Letters Patent. Patented Dec. 17, 1912.

No Drawing. Application filed April 10, 1906. Serial No. 310,926.

*To all whom it may concern:*

Be it known that I, ANTON LEDERER, a subject of the Empire of Austria-Hungary, residing at No. 83 Atzgersdorf, near Vienna, in the Province of Lower Austria and Empire of Austria-Hungary, have invented new and useful Improvements in the Manufacture of Tungsten Filaments for Incandescent Electric Lamps, of which the following is a specification.

My invention relates to the manufacture of filaments for incandescent electric lamps from the tungstates of amido derivatives of diphenyl or of the homologues.

Amido derivatives of diphenyl or of the homologues in the form of their hydrochlorids (for instance, benzidin hydrochlorid) have the property of reacting with tungstates. For example, from a normal para- or meta-tungstate solution, benzidin hydrocholrid precipitates benzidin tungstate.

For the purpose of carrying out my invention I form a paste from a tungstate of the amido derivatives of diphenyl, such as benzidin tungstate, with addition of a suitable binding material such as an ammoniacal solution of casein. In some instances it is desirable to add a small proportion of oxid of tungsten to assist in eliminating the carbon of the binder and the amido derivatives, the purpose being to facilitate the removal of the carbon. The material thus formed is then pressed into the form of threads in the usual manner. The threads are subjected to a dry distillation in absence of air and are then heated to incandescence by the electric current in an indifferent or reducing atmosphere such as nitrogen or hydrogen or in a vacuum.

What I claim as my invention and desire to secure by Letters Patent is:—

1. In the process of manufacturing tungsten filament for electric incandescent lamps a paste for producing the raw filaments composed of a tungstate of the amido derivatives of diphenyl and a suitable organic agglutinant.

2. In the process of manufacturing tungsten filaments for electric incandescent lamps a paste for producing the raw filaments composed of benzidin tungstate and a suitable organic agglutinant.

3. In the process of manufacturing tungsten filaments for electric incandescent lamps a paste for producing the raw filaments composed of a tungstate of the amido derivatives of diphenyl, a suitable organic agglutinant and a small proportion of oxid of tungsten.

4. In the process of manufacturing tungsten filaments for electric incandescent lamps a paste for producing the raw filaments composed of benzidin tungstate, a suitable organic agglutinant and a small proportion of oxid of tungsten.

In testimony whereof I have signed my name to this specification in the presence of two subscribing witnesses.

ANTON LEDERER.

Witnesses:
 JOHANN LUXÉ,
 ALVESTO S. HOGUE.